United States Patent
Arbon

(12) 
(10) Patent No.: US 7,254,682 B1
(45) Date of Patent: Aug. 7, 2007

(54) SELECTIVE FILE AND FOLDER SNAPSHOT IMAGE CREATION

(75) Inventor: Val A. Arbon, Orem, UT (US)

(73) Assignee: Symantec Corporation, Cupertino, CA (US)

( * ) Notice: Subject to any disclaimer, the term of this patent is extended or adjusted under 35 U.S.C. 154(b) by 554 days.

(21) Appl. No.: 10/902,690

(22) Filed: Jul. 28, 2004

(51) Int. Cl.
*G06F 12/00* (2006.01)

(52) U.S. Cl. .................................................. 711/161

(58) Field of Classification Search ................. 711/161, 711/162; 707/200, 204
See application file for complete search history.

(56) References Cited

U.S. PATENT DOCUMENTS

| | | | |
|---|---|---|---|
| 5,907,672 | A | 5/1999 | Matze et al. |
| 6,178,487 | B1 | 1/2001 | Ruff et al. |
| 6,748,504 | B2 | 6/2004 | Sawdon et al. |
| 7,111,014 | B2 * | 9/2006 | Sawdon et al. ............. 707/102 |
| 2003/0158861 | A1 * | 8/2003 | Sawdon et al. ............. 707/200 |
| 2005/0050110 | A1 * | 3/2005 | Sawdon et al. ............. 707/201 |
| 2006/0206536 | A1 * | 9/2006 | Sawdon et al. ............. 707/200 |

OTHER PUBLICATIONS www.bombich.com; "Carbon Copy Cloner"; taken from referenced cite Jun. 18, 2004.
www.versiontracker.com; "SubRosaSoft CopyCat 1.03—Versiontracker"; taken from referenced cite Jun. 18, 2004.
http://gd.tuwien.ac.at/linuxcommand.org; "Ivcreate"; taken from referenced cite Jun. 18, 2004.
http://compudoc.princeton.edu; "File Restore with Linux/Unix"; taken from referenced cite Jun. 18, 2004.
www.survalent.com; "Operator Training Simulator"; taken from referenced cite Jun. 18, 2004.
http://macslash.org; "Mac Slash"; taken from referenced cite Jun. 18, 2004.
www.microsoft.com; "Imgmount / mount"; taken from referenced cite Jul. 15, 2004.
Altiris; "Rapideploy 6.1 Help"; pp. 1-6, 11-14, 70-77, 99-100.
Ananda Sankaran et al.; "Volume Shadow Copy Serivce"; Power Solutions Mar. 2004; pp. 14, 16-18.

\* cited by examiner

*Primary Examiner*—Kevin L. Ellis
(74) *Attorney, Agent, or Firm*—Workman Nydegger

(57) ABSTRACT

Tools and techniques are provided for using a snapshot, not a full volume copy, to preserve deleted items when creating an image file with other items from a computer storage volume. One method classifies items as desired or not, enables snapshotting, then deletes undesired items, then creates a blockwise volume image in which the deleted items are not imaged, and finally disables snapshotting. Systems and configured storage media for imaging selected files and folders are also provided.

29 Claims, 7 Drawing Sheets

SELECTIVE FILE AND FOLDER SNAPSHOT IMAGE CREATION

BACKGROUND OF THE INVENTION

FIGS. 1 and 2 illustrate conventional approaches to creating an image file which contains files and folders selected from among files and folders stored on a volume for access by a computer, and doing so without permanently losing user data from the source volume. The process illustrated in FIG. 1 backs up the volume to an image file, deletes unwanted files and/or directories from the volume, takes an image of the reduced volume into a second image file, and then restores the volume from the first image file. The process illustrated in FIG. 2 backs up the volume to another disk (or set of disks), deletes unwanted files and/or directories from the backup disk, and then images the backup disk.

Other approaches (often referred to as "file-by-file" approaches) are also known for making a copy of selected files or folders from a volume. However, file-by-file approaches do not create an "image" as that term is used in this document. An image is created in a block-by-block manner, and reflects that by typically preserving low-level block allocation assignments. This may be evident, for instance, in the preservation of file fragmentation, and the preservation of optimizations that reduce disk head movement. Images may thus be created in a sector-by-sector, cluster-by-cluster, or other low-level allocation-unit-by-allocation-unit manner, as opposed to being created in a file-by-file manner. Images are found, for instance, in the *.v2i files created and used by commercially available imaging software tools from Symantec's PowerQuest Division, such as V2I PROTECTOR or V2I BUILDER software (marks of Symantec Corporation PowerQuest Division).

To perform the process shown in FIG. 1, one must have enough available space on some storage medium to make the image A. During at least part of the FIG. 1 process, one is hindered or prevented from allowing the source computer to function normally because files are missing from the source. One may also need to move large amounts of data to make the image A, and to restore the source. The process shown in FIG. 2 may be considered an improvement over that shown in FIG. 1, in that the source data is only copied once, to temp, instead of being copied twice (source to image A, then image A to source). However, under the process of FIG. 2 one must generally move a full copy of source to temp, and one must have enough available space in temp to hold the copy.

Similar considerations apply when it is desired to obtain an image of only selected items from multiple volumes, and also apply regardless of whether the desired item(s) includes files, folders (e.g., directories), or both.

SUMMARY OF THE INVENTION

This summary is partial and is for convenience only; the invention is defined by the claims as granted and properly interpreted. Some embodiments of the invention are methods for using a snapshot and creating an image file that holds selected items found on a computer-readable storage volume, without permanently removing data from the volume. Some embodiments are methods for using a snapshot, rather than a full volume copy, to preserve deleted items when creating an image file with other items from a computer storage volume. Some embodiments are systems for creating an image file with selected files. Some embodiments are computer-readable storage media configured by software for performing a method of selective file and folder snapshot image creation. Other aspects of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not fully determine the invention's scope.

DETAILED DESCRIPTION

Figure 1:
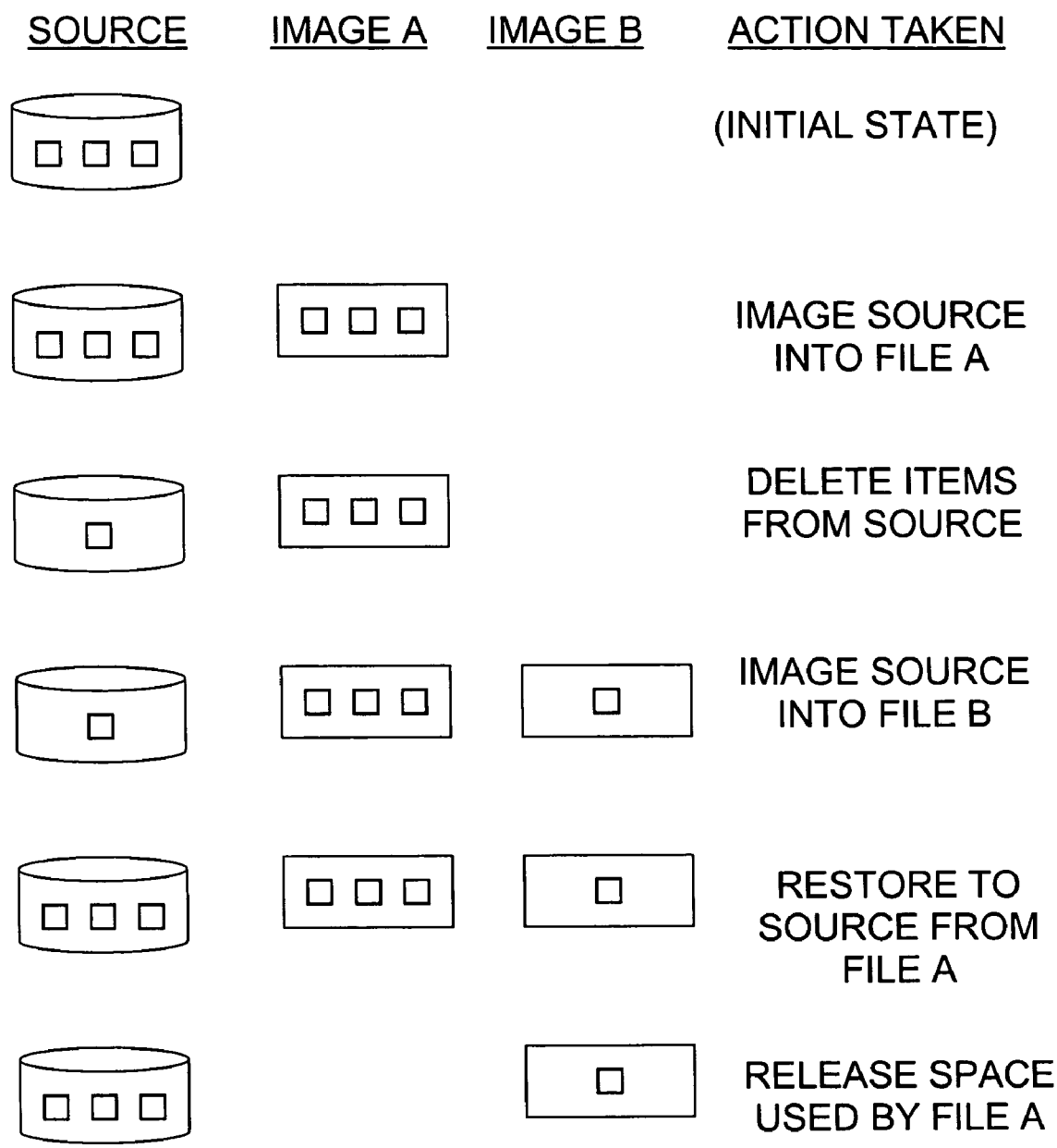
FIG. 1 is a diagram illustrating a conventional approach to obtaining an image file holding only particular items, and doing so without permanently removing data from the imaged volume, using two image files.

Reference will now be made to exemplary embodiments such as those illustrated in the drawings, and specific language will be used herein to describe the same. But alterations and further modifications of the inventive features illustrated herein, and additional applications of the principles of the inventions as illustrated herein, which would occur to one skilled in the relevant art(s) and having possession of this disclosure, should be considered within the scope of the invention.

In describing the invention, the meaning of important terms is clarified, so the claims must be read with careful attention to these clarifications. Specific examples are given to illustrate aspects of the invention, but those of skill in the relevant art(s) will understand that other examples may also fall within the meaning of the terms used, and within the scope of one or more claims. Words used herein do not necessarily have the same meaning they have in everyday usage. Terms may be defined, either explicitly or implicitly, here in the Detailed Description and/or elsewhere in the application file.

For instance, a distinction is noted above between file-by-file approaches, on the one hand, and sector-by-sector/cluster-by-cluster/other block-by-block approaches, on the other hand. That distinction helps define the term "image" in the claims and elsewhere in this document. A file-by-file backup is not an "image" in terms of the present invention, regardless of whether the term image is used in other documents to include file-by-file backup results. Likewise, creating a file-by-file backup is not "imaging" according to the meaning intended here.

For convenience, this document uses the term "folder" to mean a named group of one or more files. Some file systems use the term "folder" for this concept, while some use the term "directory". For purposes of the present invention, file system folders (whether arranged in a flat, hierarchical, linked, or other structure), individual directories, and directory subtrees each include one or more folders.

When discussing desired or undesired items, the term "item" refers to files, to folders, or to both, according to the context.

A "volume" is a fixed amount of storage on a disk, tape, memory stick, or other computer-readable storage medium, which is organized by at least one file system. The term volume is sometimes used as a synonym for the storage medium itself, but it is possible for a single disk to contain more than one volume, for example, or for a volume to span more than one disk. The term "volume" does not imply use of any particular storage or processing hardware, any particular file system, any particular operating system, or any particular network. The invention may operate with, and/or include instances of, various file systems, operating systems, networks, and computer hardware architectures.

The term "deleting" does not necessarily require completely removing all traces of an item's data from storage. It can be sufficient to delete an item by marking the item as being hidden from applications such as word processors, databases, and spreadsheets. In a system without snapshots enabled, deleting would generally mark as available the space allocated to the deleted item. In a snapshot-enabled system, however, some data deleted after the snapshot was enabled can be recovered.

It is not necessary for every means or aspect identified in a given definition or example to be present or to be utilized in every embodiment of the invention.

Methods

FIGS. 3 through 7 illustrate embodiments of the present invention. The invention may be embodied in methods, in storage media configured to perform methods, and in systems, for example. Although we focus discussion on methods at this point, it will be understood that much of what is said about method embodiments also helps explain configured medium and system embodiments, and vice versa.

Figure 3:
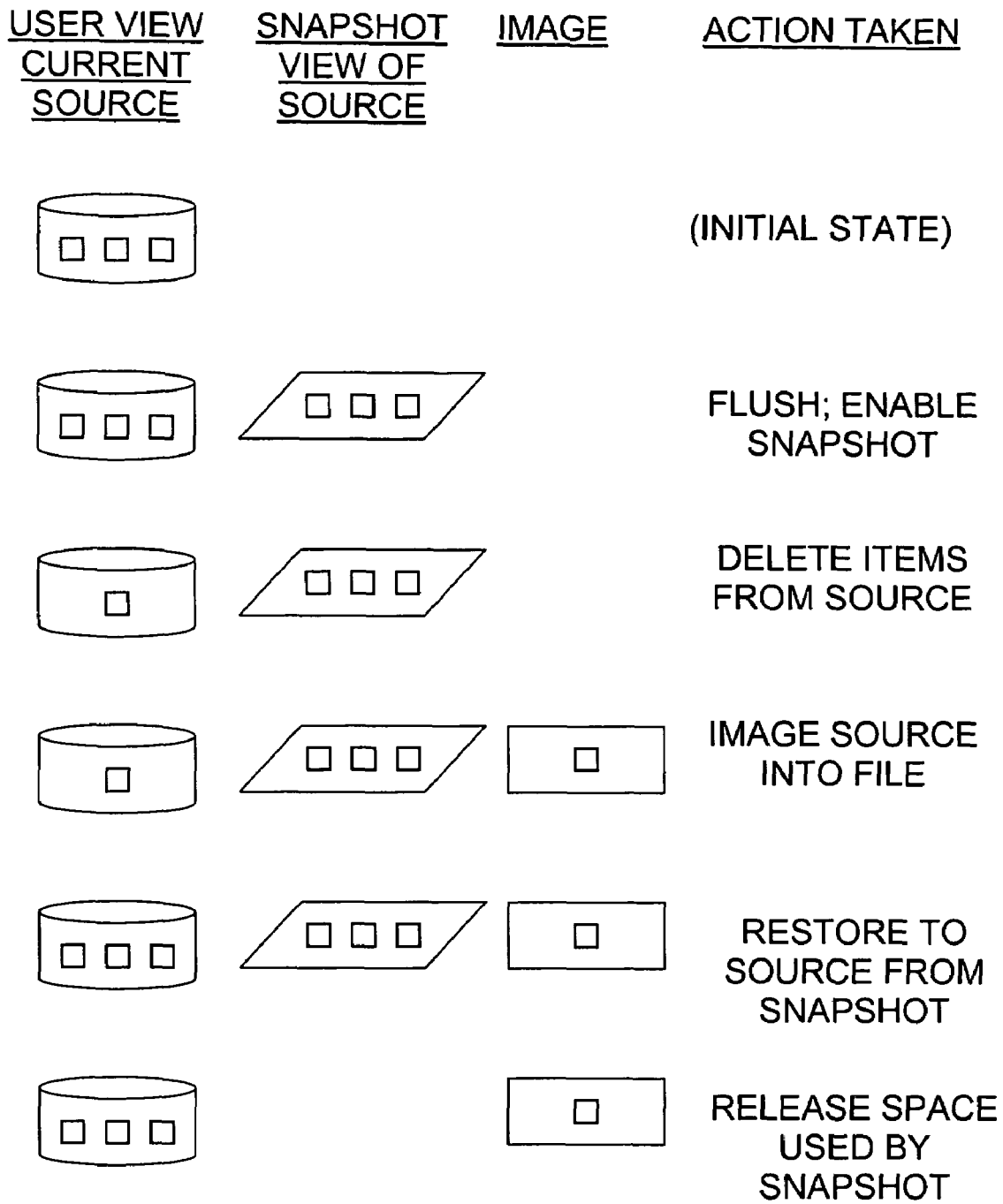
FIG. 3 is a diagram illustrating embodiments of the present invention which create an image file holding only selected items, without permanently removing data from the imaged volume, using a snapshot to restore data to a source volume after deleting undesired items from the volume and imaging the reduced volume.
Figure 4:
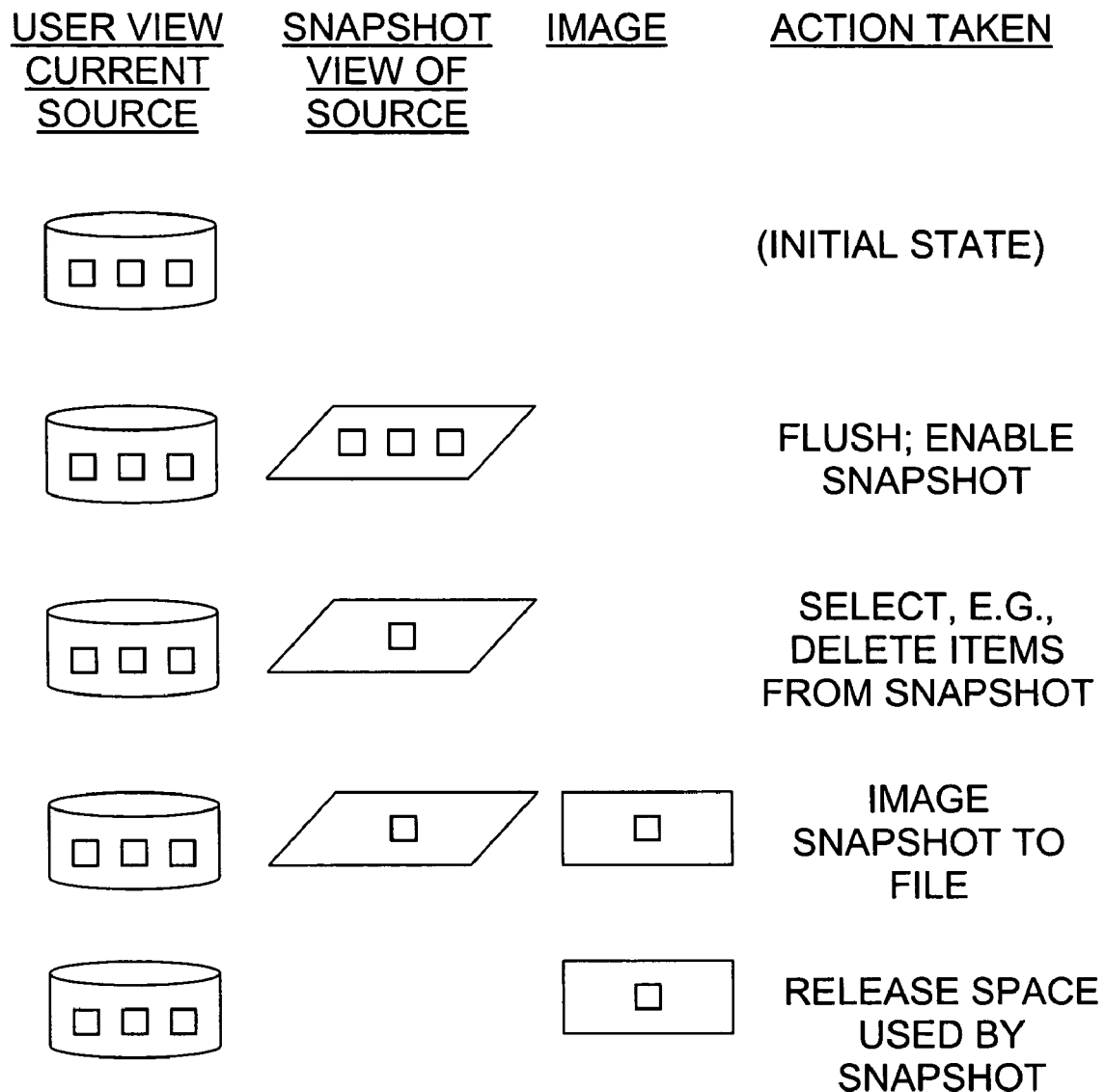
FIG. 4 is a diagram illustrating embodiments of the present invention which create an image file holding only selected items, without permanently removing data from the imaged volume, by deleting undesired items from a snapshot view of the source volume and imaging the reduced snapshot view.

FIG. 3 is a diagram illustrating embodiments of the present invention which create an image file holding only selected items, without permanently removing data from the imaged volume, using a snapshot to restore data to a source volume after deleting undesired items from the volume and imaging the reduced volume. FIG. 4 is a diagram illustrating embodiments of the present invention which create an image file holding only selected items, without permanently removing data from the imaged volume, by deleting undesired items from a snapshot view (shadow) of the source volume and imaging the reduced snapshot view. Some embodiments may delete some items from the volume and others from a snapshot view of the volume.

Figure 6:
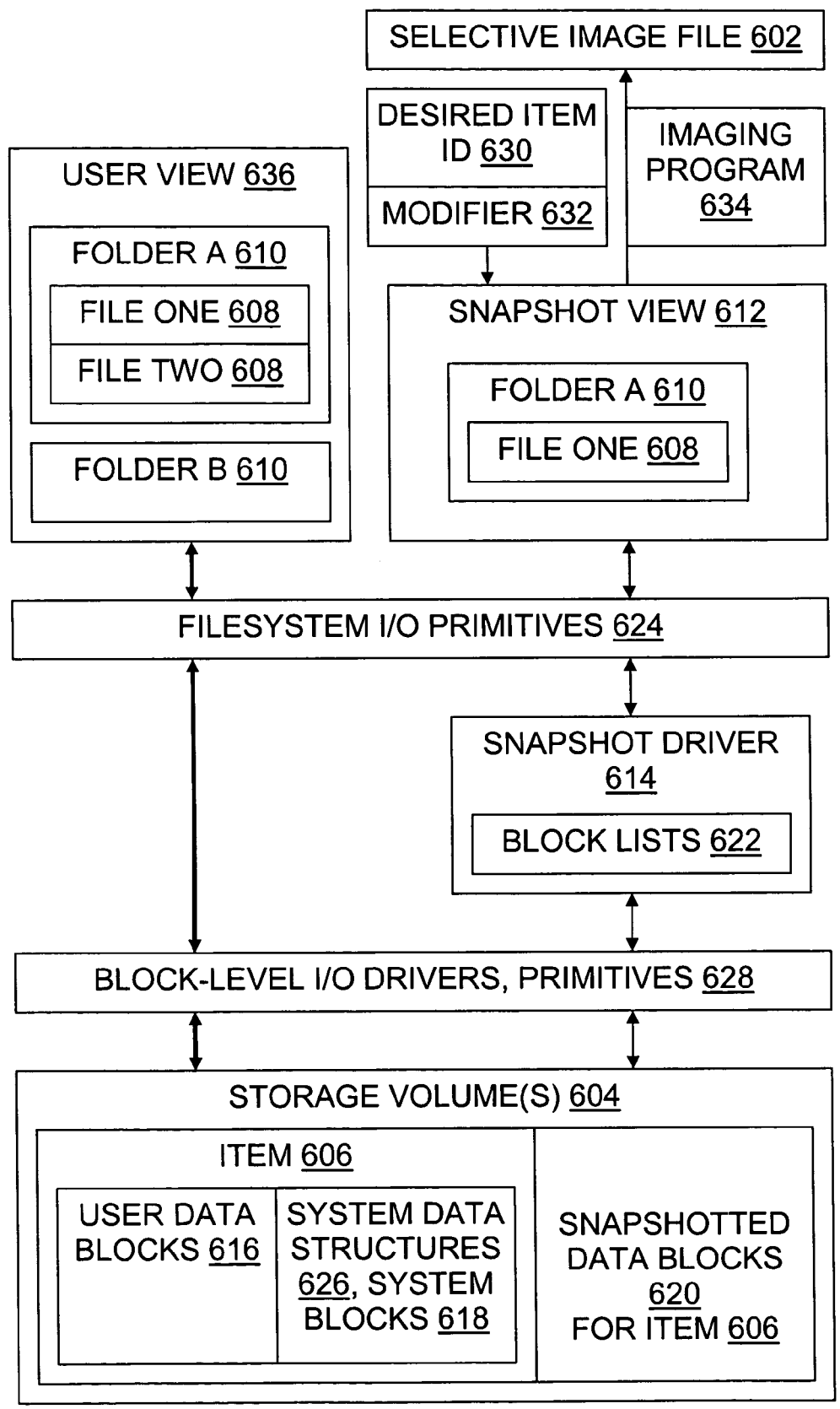
FIG. 6 is a diagram illustrating data flow and systems of the present invention.

For ease of illustration, a cylinder is used in FIGS. 3 and 4 to represent the storage volume, such as volume 604 of FIG. 6. But as noted above, a volume is not necessarily stored on disk, and in some instances a volume spans multiple disks when it is stored on disk. Similarly, although a single rectangle represents the image in these two figures, an image (such as image 602 of FIG. 6) may be stored in practice on several removable media, on another volume, or in a previously free portion of the source volume's disk, and an image may be stored in one or more files, for example.

A small square is used in FIGS. 3 and 4 to represent an item stored in the volume, such as item 606 of FIG. 6. As noted above, an item may be a file 608 or a folder 610, depending on the embodiment. In the figures, three small squares represent a set of items 606 before selective deletion 514 of undesired items from the set, and one small square represents the set of items after such a deletion. In practice, of course, the invention is not limited to situations in which the set of items contains exactly three items before deletion and exactly one item afterward; rather, one or more items may be present before deletion, and zero or more may be present afterward. Moreover, in general selection 514 may add one or more items, and in general selection 514 may modify one or more items, expressly or by modification of the item context through, e.g., changes in security settings.

A slanted parallelogram is used in FIGS. 3 and 4 to represent a snapshot view of the source volume, such as snapshot view 612 of FIG. 6. Snapshots permit one to view a storage volume in at least some of its various states at different points in time. A snapshot view, like a normal user view without a snapshot mechanism intervening, includes a set of items presented to users and applications software. But a snapshot view presents an alternate version (or in some cases, multiple alternate versions) of the storage volume. A snapshot view is obtained through a snapshot driver or equivalent, such as snapshot driver 614 of FIG. 6.

Snapshot drivers are sometimes called "copy-on-write" filters or drivers. A snapshot mechanism monitors all write operations on a selected volume and copies the old data on blocks that are going to be overwritten to another location before they are overwritten. Then it exposes the old blocks as part of the volume state at the time of the snapshot. This often means that most of the volume is represented by the original blocks on the volume, so there is not necessarily a copy made of these blocks. Only blocks that are modified after the point-in-time of the snapshot are redirected to another location where the old data is stored. The volume state that is captured at the point-in-time is made up of the driver's knowledge of the volume's unmodified blocks in their original locations on the disk and the old blocks that have been copied to new unused locations.

The term snapshot "driver" is used herein for convenience. It is also used in recognition that drivers are low-level software, and the snapshot driver or its equivalent operates at a relatively low level of abstraction, that is, near the hardware 604. The snapshot driver (including driver equivalents) tracks changes to individual storage allocation units such as sectors, clusters, or other blocks 620 and maintains copies of data that would otherwise be overwritten. The snapshot may additionally or alternately be maintained by a daemon, module, system service, thread, process, task, or other software, for instance. It could also be implemented in special-purpose hardware using PALs, ASICs, FPGAs, or other chips. Indeed, it will be recognized that hardware and software are often interchangeable, in terms of functionality if not cost. Likewise, the snapshot driver may use block lists 622 to track the location of data copies and their relation to data that would otherwise have overwritten their content, or the driver 614 may use an array, tree, or other data structure to maintain that information. For convenience, "driver" hereafter includes daemons and other driver equivalents, and "block list" hereafter includes other data structures used to maintain a snapshot.

One method of the invention for using a snapshot and creating an image file that holds selected items found on a computer-readable storage volume, without permanently removing data from the volume, includes the step of identifying at least one desired item which is located on the storage volume. This may be done by classifying 502 all items 606 of the storage volume 604 as being either desired or undesired. Alternately, it may classify only some items of the volume as desired (or as undesired) and leave other items presently unclassified as to desirability. Items which are not within the scope of the imaging need not be classified as to their desirability for inclusion in the image. For example, the imaging software may allow one to specify that only a specified subtree or a specified partition should be imaged, in which case only those items that are within the scope of the specified subtree or the specified partition need to be classified as to desirability.

Desirable items are those which a human user (or equivalently software operating on the user's behalf) evidently desires to place within the image 602; undesired items are those which the user wants excluded from the image. Default treatments may be embedded in software that performs the method, such as treating as undesired all items not expressly identified as desired, or treating as desired all items not expressly identified as undesired. Including or excluding a particular item in the image effectively classifies 502 that item if it was not previously classified. Items could be identified by listed file name, folder name, checkbox selection next to a name, highlighting, dialog box, or other familiar or forthcoming interactive or batch mode interface means. Some implementations could place within the snapshot driver the code that checks to see whether a file/block is wanted, while other implementations could place that code outside the snapshot driver.

Figure 5:
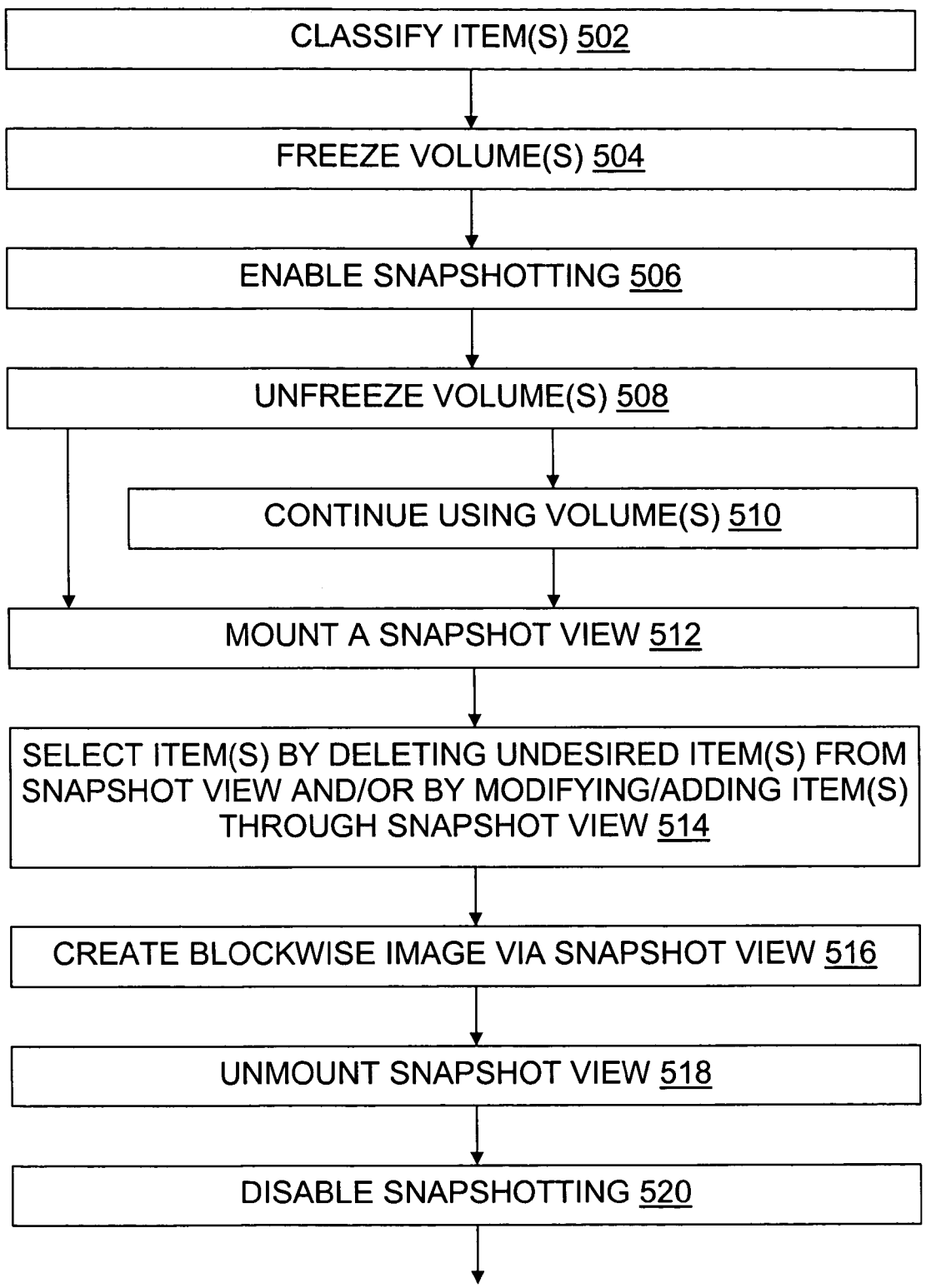
FIG. 5 is a flowchart illustrating processes of the present invention.

Some methods include freezing 504 the volume to prevent any changes to it. This could be done by invoking an operating system service, for instance. It could also or alternately be done by informing running applications to freeze by flushing their current state to disk and to hold or log transactions. Although FIG. 5 shows freezing step 504 after classifying step 502, it will be understood that the invention is not necessarily limited to performing these steps in that order.

More generally, although steps are shown in a particular order in the figures, that is done in part for ease of illustration. Those of skill will appreciate that steps may also be performed in reversed order, or concurrently, when the outcome of a given step is not needed before the commencement of another step. Steps may also be named differently, grouped differently, repeated, and/or omitted, except as specifically required by the claims and operability of the invention.

A snapshot enabling step 506 enables a snapshot of at least a portion of the storage volume which includes the desired item. This may include initializing the block list 622, setting a flag or a state to control an interrupt vector, or causing other operations so that file system I/O calls 624 to read and write sectors go to and from the volume by way of the snapshot driver, for example. Enabling the snapshot does not necessarily copy user data 616 from the volume 604 to an image file or anywhere else. Rather, it initiates tracking so that subsequent writes to the volume will not overwrite files that are protected by the snapshot but will instead result in a copy of both the new data 616 and the previous data 620 being stored, with their relationship reflected in the block list.

After snapshotting is enabled, an unfreezing step 508 may unfreeze the source volume so that use of it can optionally continue 510. This may be done by invoking an operating system service, and/or by informing the running applications to continue their normal operations and to process their held log transactions. Freezing volumes, unfreezing volumes, and making snapshots are each familiar in the art.

After the snapshot enabling step 506, these methods include selecting 514 one or more items. This may include, for instance, applying 514 additional security attributes to one or more specific items, removing 514 security attributes of one or more specific items or otherwise changing security attribute values, moving 514 one or more specific items, renaming 514 one or more specific items, and/or deleting 514 at least one item other than the desired item. Some tools for changing security attributes, moving items, renaming items, and/or deleting items, such as a graphical user interface, an operating system Application Program Interface ("API"), and a file system API, are familiar in general, but operate through a snapshot view in some embodiments of the present invention.

Deleting may delete one or more items from a user view while snapshotting is enabled, from a snapshot view, or from both views. FIG. 3 illustrates deleting items from a user view while snapshotting is enabled. Without snapshotting, deletion would free sectors (or other allocation blocks), and allow their data to be lost by being overwritten. Snapshotting preserves data by diverting the write to another location and noting that diversion in a block list. From the perspective of a user, however, and the perspective of most applications, the item(s) have been deleted; the snapshot driver responds to read requests by providing the most recent version of each block. Thus, an imaging program 634 will read the values for file system structures (Master File Table, File Allocation Table, inode, etc.) 626 from system blocks 618 that reflect deletion or other modification of the items in question. The pre-modification data still exists on the volume, but it is not provided to applications such as word processors or spreadsheets that operate on files rather than on individual blocks. If the imaging software's block reads would bypass the snapshot driver, then the driver 614 functionality should be implemented within the imaging program so that a correct (no deleted data) and internally consistent set of blocks is read into the image 602.

After imaging 516 through the user view in this manner, the snapshot driver is instructed to restore the original data. This can be accomplished by disabling 520 the diversion, so that read requests go to the original block location. It could also be done by copying each block of original data to the new location, thus overwriting the new data at that location, but this requires data copying that is generally better to avoid. Blocks that were used during snapshotting but are no longer needed can be marked 520 free in the file system structures 626.

FIG. 4 illustrates deleting or otherwise selecting 514 items from a snapshot view while snapshotting is enabled. If continued use 510 of the volume will be made while the snapshot view is being modified, then the snapshot driver 614 maintains at least two block lists 622, and there are at least three preserved volume states represented in data blocks 620: the state in which snapshotting was initially enabled 506, the subsequently modified 510 user state as presented to the user and to non-imaging user applications such as word processors and spreadsheets, and the subsequently modified 514 snapshot state as presented to the imaging application 634. One block list reflects changes from the initial state to the subsequent user state and provides the user view 636, and the other block list reflects changes from the initial state to the subsequent snapshot state and provides the snapshot view 612. Of course, these two block lists may be implemented in a single linked list, array, tree, or other data structure, with suitable tags, fields, bitflags, or the like to distinguish the two historic lineages namely, the lineage ending in the user view, and the one ending in the snapshot view.

Some methods of the invention include mounting 512 a snapshot view 612 of the volume 604. This includes viewing the data blocks on the disk through a block list, but it does not necessarily imply ongoing use 510 of the volume for purposes other than creating an image with selected items. Once mounted, file system operations (such as listing the content of a directory, changing security attributes, deleting a file, and deleting a directory) can be performed on the snapshot view. When performed on the main user view while a snapshot is enabled, such deletions are normally reversible. But when performed on a snapshot view, item deletions are not necessarily reversible, because changes to the block list are not necessarily tracked in a way that makes them readily reversible. Of course, items deleted from a snapshot view may still be recoverable in the sense that their data 616 through 620, 626 is stored on the volume, in locations managed by the block list, rather than being overwritten.

Items to be deleted or modified can be identified by listing their names (or in some cases the name of a folder containing them) in a list 630 of undesired items. Alternately, the items to be retained and imaged as is can be listed 630. A batch or command file modifier 632 such as a deleter 632 can use the list as input to delete undesired items, to flag or unhide or relocate desired items, or both. An interactive software deleter 632 can alternately or in addition obtain the identities of desired/undesired items (files, folders, or both) from the user through dialog boxes like those used normally for navigation and manipulation of items within applications such as word processors. Similar identification means and approaches can be used by a modifier 632 which applies additional security attributes, removes security attributes, moves items, renames items, or otherwise selects 514 items expressly or implicitly by context. The deleter 632 may use normal file system calls 624 to delete items, for instance; the snapshot driver will divert sector I/O requests made by the file system primitives, to update the data blocks 620 accordingly to create an internally consistent set of data blocks which reflect the deletions. Likewise, when the selection 514 changes security attributes, or modifies file or folder names or locations, the changes and modifications will be tracked by the snapshot mechanism(s).

After the selecting step 514, the imaging step 516 images the desired item(s) into an image. The image lacks the deleted item(s) by reason of the deleting (if any) in this step, and reflects any changes to security attributes or file/folder name/location. After items are deleted from the user view, from the snapshot view, or both, the remaining items are considered to be desired items. Imaging software then images the remaining items into the image 602. As noted, the imaging software operates to copy data 616, 618 in a block-wise manner, not file-by-file, even though the items selected for the image are files and/or folders of files. Imaging functionality and snapshot functionality are individually familiar in the art, but their combination, alteration, and interaction according to the present invention are believed to be new.

After the imaging step, snapshot resources are released. Depending on the implementation, this may include removing an interrupt vector from a vector table to disable 520 snapshotting, so the snapshot driver no longer diverts I/O requests according to the block list. It may include marking as free the space that was used by the block list and the saved blocks. It may include unmounting 518 the snapshot view. It may include releasing a deleted item by restoring it from the snapshot to the storage volume as illustrated in FIG. 3.

Thus, in some methods of the present invention the deleting step 514 deletes from a snapshot view 612 of the storage volume 604 at least one item 606 other than a desired item 630, and the imaging step 516 then images the desired item into an image 602 from the snapshot view of the storage volume. This is consistent with the approach illustrated in FIG. 4.

In some methods, the deleting step 514 deletes from the storage volume 604 at least one item other than the desired item, the imaging step 516 then images the desired item into the image 602 from the storage volume, and the releasing step includes releasing the deleted item by restoring it from the snapshot to the storage volume. This is consistent with the approach illustrated in FIG. 3.

The invention provides methods for using a snapshot, rather than a full volume copy, to preserve selected items when creating an image file with items from a computer storage volume. One such method includes the steps of: classifying 502 each item 606 on the storage volume 604 or a specified portion thereof as being either a desired item or else an undesired item, e.g., by listing, selecting, or otherwise identifying 630 the desired items; enabling 506 a snapshot of the storage volume which includes the desired item, thereby providing a snapshot view 612 of the storage volume; deleting 514 an undesired item from the snapshot view of the storage volume, as illustrated in FIG. 4; and imaging 516 the desired item from the snapshot view of the storage volume into an image 602. Other methods combine deleting and security modifying operations in selecting step 514.

The classifying step 502 may include obtaining a list 630 of desired items, after which each item on the storage volume 604 or specified portion thereof that is not listed on the list is classified as an undesired item. Alternately, the classifying step may include obtaining a list of undesired items, and each item on portion of the storage volume (or full volume) that is not listed on the list is classified as a desired item.

In some methods of the invention, the snapshot enabling step 506 is preceded by the step of invoking an operating system service to freeze 504 the volume to prevent changes to it. In some methods, the snapshot enabling step is preceded by the step of notifying a running application to flush 504 its current state to disk.

In some methods, the snapshot enabling step 506 is followed by the step of making use 510 of the storage volume(s) 604, for purposes other than imaging and snapshotting, while the snapshot tracks changes to the volume(s) caused by such use. For instance, word processing, database, web service, and other applications may be permitted to continue their normal use (perhaps with degraded performance) while the selective item snapshot image is created. In methods according to FIG. 3, however, such continued use may interfere with or be inconsistent with the deletion 514 of items and so should be avoided.

In some methods, including some methods illustrated by FIG. 4, the selecting step is preceded by the step of mounting 512 the snapshot view, and the deleting step 514 invokes an operating system API or a file system deletion/modification tool through a file system user interface or an operating system interface that is also used to delete/modify items when no snapshot is enabled. That is, normal file system or operating system operations are called to delete/modify at least one item of the mounted snapshot, e.g., to change security attributes and/or to delete all undesired items. This causes the file system and/or operating system to modify system structures accordingly. Through the snapshot driver, an instance of the system structures 626 is made which reflects the deletion in the way the structures would normally but irreversibly reflect deletion in the absence of a snapshot. System volume definitions 626 are updated; file allocation structures 626 such as MFTS or FATs are updated; directory trees 626 are updated, and so on. Importantly, this results in a complete and consistent view of the updated file system instance.

Methods of the invention for using a snapshot when creating an image file of selected items stored in a volume readable by a computer can be performed automatically according to a predefined schedule, or they can be performed simply when needed or desired by a particular person.

Although the inventive methods are performed directly by computer hardware and software, they are used by people. They are performed on behalf of and in response to some person's controlling action. Regardless of whether one phrases the invention in terms of steps taken by a person to control a machine that performs a process, or in terms of using a corresponding process performed by a machine, those of skill will understand that it is the particular nature of the process itself that sets it apart as inventive.

For example, a claim may be phrased in terms of direct human action, such as: providing input which permits a computer program to classify each item on the volume as being either a desired item or else an undesired item; causing the computer to enable a snapshot of the volume which includes all desired items, thereby providing a snapshot view of the volume; causing the computer to delete all undesired items from the snapshot view of the volume; causing creation of an image that is made by imaging the desired items only (no undesired items) from the snapshot view of the volume; and causing the computer to disable the snapshot, after which the undesired items are visible on the volume. Alternately, similar steps may be given in terms of direct computer action, as: classifying each item on the volume as being either a desired item or else an undesired item; enabling a snapshot of the volume which includes all desired items, thereby providing a snapshot view of the volume; deleting all undesired items from the snapshot view of the volume; creating an image that is made by imaging the desired items only (no undesired items) from the snapshot view of the volume; and disabling the snapshot, after which the undesired items are visible on the volume. In the latter case, the underlying human action of making, using, selling, and/or offering to sell the process, is inherent and understood even when it is not expressly stated. Although the scope may differ with the phrasing and the particulars of the situation, in each case the invention is directly exploited.

More generally, the steps and other characteristics described herein may be combined in various ways to form embodiments of the invention. In methods of the invention, steps may be omitted, repeated, renamed, supplemented, performed in serial or parallel, and/or grouped differently, except as required by the claims and to provide an operable embodiment. In particular, not every step illustrated in FIG. 5 need be performed in a given method according to the invention.

Even though particular embodiments and uses of the present invention are expressly illustrated and described individually herein, it will be appreciated that discussion of one type of embodiment and its uses also generally extends to other embodiment types and their uses. For instance, the foregoing description of the invention's methods also helps describe the structures and operation of the invention's systems and configured storage media, and vice versa.

Systems

Figure 7:
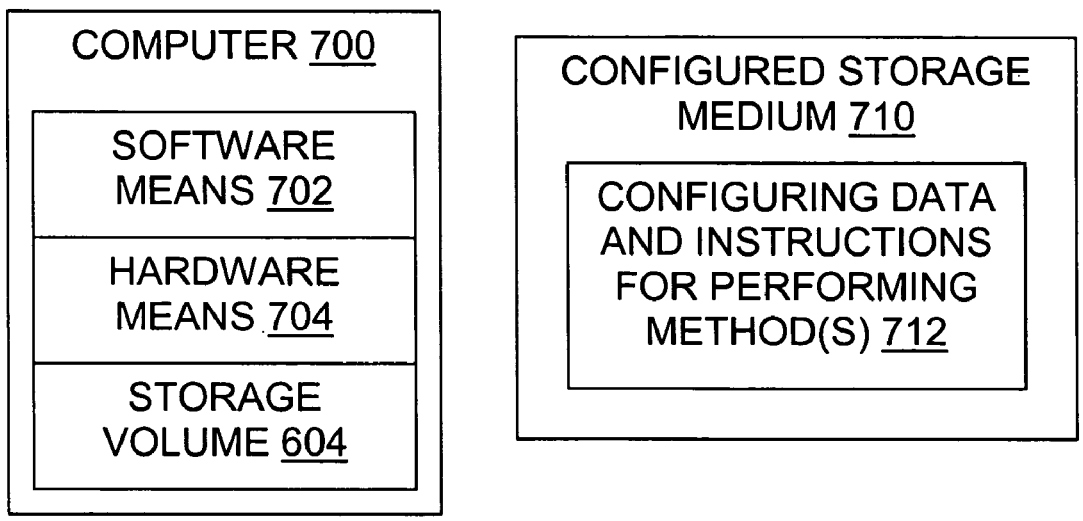
FIG. 7 is a diagram illustrating system and article embodiments of the present invention.
Figure 7:
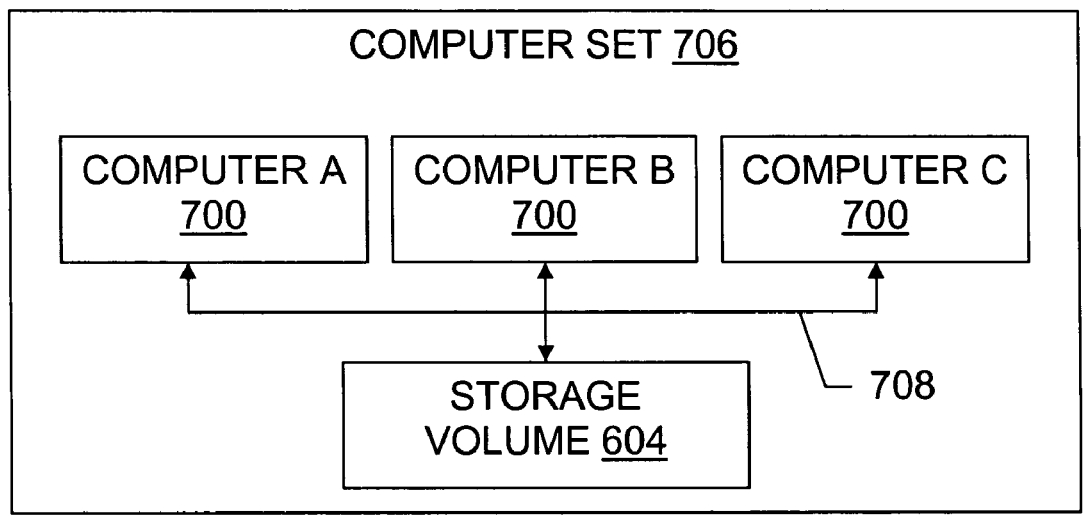
Figure 7:
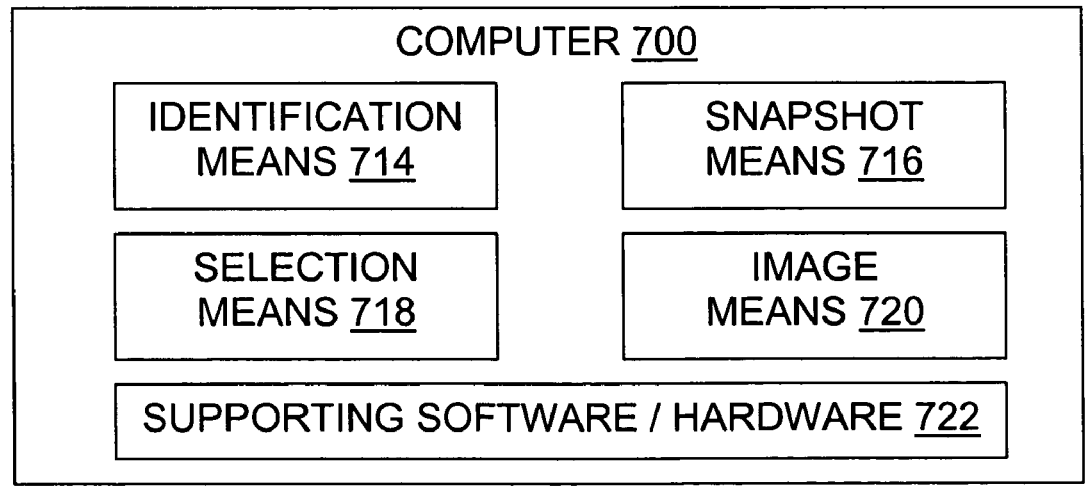

As illustrated in FIGS. 6 and 7, for example, the present invention also provides systems. The systems of the invention are not limited to those shown in these figures. Different embodiments may omit, repeat, regroup, supplement, or rearrange the components illustrated, provided the system overall is operable and conforms to at least one claim. Any computer or set of computers configured with software and/or special-purpose hardware to operate according to a method of the invention, including without limitation methods discussed in connection with any of FIGS. 3 through 5, is also a system according to the invention, if only because through such a system one uses a claimed method.

Some systems for creating an image file with selected files according to the invention include a single computer storage volume 604 holding files; some systems include multiple storage volumes. Some systems include multiple computers 700, and not necessarily every computer in the system has its own storage volume. For example, a set 706 of several computers 700 in a system could be connected by a network 708 or otherwise connected to a single storage appliance 604, a RAID system 604, or another storage volume 604. The step of classifying 502 items as desired or undesired could be performed on one computer in the system, while the snapshot view is mounted on a second computer and continued use of the storage volume is made primarily through a third computer. Other configurations are also possible.

In some embodiments, each of one or more computers 700 includes software means 702 providing at least a portion of the invention's functionality, and hardware means 704 providing additional functionality of the invention. It will be understood that functionality found in software in one implementation may often be provided instead in hardware in another implementation, and vice versa. However, it will also be understood that minimal levels of software will exist, if only because hardware flexibility is often expensive, and that minimal levels of hardware will exist, if only because software must have some hardware on which to run and in which to be stored. Accordingly, software means 702 includes at least I/O software 624, 628, a snapshot mechanism 614 unless that is implemented in special-purpose hardware, and supporting data such as a block list 622. Hardware means 704 includes at least storage for the software (generally both volatile and non-volatile storage), one or more processors (CPU, ALU, motherboard, etc.) in operable connection with at least the volatile storage, storage volume hardware (e.g., disks with controllers), and possibly other hardware such as networking hardware, user GUI hardware, and so on. These means may be further identified by those of skill according to the particular functionality involved.

For example, the means 702 and/or 704 may include an identification means 714 for obtaining an identification of files of the storage volume. The identification means distinguishes desired files from undesired files. Accordingly, the identification means 714 can be implemented to include, for instance, software that performs step 502, and supporting hardware 722 such as a processor to execute that software and a memory to hold that software. In some file systems, files are organized in folders, in which case the identification means may permit a file to be identified indirectly through identification of a folder containing the file; selecting a folder is interpreted by the identification software 714 as selecting each file in the folder. It may also be interpreted as selection of subfolders, depending on the implementation and user preferences.

The means 702 and/or 704 may include a snapshot means 716 for tracking changes to the storage volume. The snapshot means preserves a copy of data that is changed while the snapshot means is enabled and does so without requiring a copy of all data of the storage volume. The snapshot means further provides a snapshot view of the storage volume. The snapshot means may be implemented to include, for instance, a snapshot driver 614, block list 622 (inside or outside the driver), software that performs snapshot enabling step 506 and snapshot disabling step 520 and the intervening snapshotting, and supporting hardware 722 such as a processor to execute that software and a memory to hold that software.

In some implementations, the snapshot means 716 includes software that performs freezing step 504 and unfreezing step 508, and supporting hardware 722 (processor, memory, and so on).

In some implementations, the snapshot means 716 includes software that performs snapshot view mounting step 512 and snapshot view unmounting step 518, and supporting hardware 722. Implementation of the mounting and unmounting software may be informed by knowledge of U.S. patent application Ser. No. 10/406,139 filed Apr. 2, 2003, entitled "Using Disassociated Images for Computer and Storage Resource Management". As noted in the Disassociated Images application, the V2i Protector product from PowerQuest Corporation provides a driver that lets users mount an image file as a readable drive on a computer running a file system under a Microsoft Windows brand operating system. (V2I and V2I PROTECTOR are marks of PowerQuest Corporation). The discussion of "management environment" functionality from the Disassociated Images application is also incorporated herein by this reference.

The means 702 and/or 704 may include a selection means 718, which may in turn include a security modification means for changing security parameters such as file security attribute values, access control lists, and the like. The selection means 718 may also include a deletion means 718 for deleting undesired files from the snapshot view of the storage volume. In some implementations, the selection means 718 includes the modifier 632, such as a security modifier 632 or a deleter 632 or other software that performs modifying/deleting step 514, such as batch file processors, command interpreters, file GUIs, and/or file system I/O routines 624, to modify security parameters, and/or to delete files that are not desired files 630, and also includes supporting hardware 722.

The means 702 and/or 704 may include an image means 720 for imaging files, corresponding file system data, and other volume system data, by imaging from the snapshot view of the storage volume into an image 602. In some implementations, the image means 720 includes an imaging program 634 such as PowerQuest V2I software, PowerQuest Drive Image software, Symantec GHOST software (tailored through environment variables and/or command line parameters to make sector-by-sector images), or other imaging software, to create an image 602. (V2I and DRIVE IMAGE are marks of Symantec Corporation's PowerQuest division; GHOST is a mark of Symantec Corporation). As noted, the image 602 may be stored in one or more files, or it may be stored in a container outside the scope of a standard file system. The imaging software may use built-in block-level I/O software 628 such as BIOS calls and/or calls to an operating system API, or it may contain its own block-level routines that interface directly with the disk controller(s), for example.

In some implementations, these means 714-720 collectively include computer hardware and computer software running on that hardware. Although implementations done completely in hardware are within the invention's scope, they may well be too costly to provide a commercial benefit unless hardware costs fall substantially from their present levels.

In some implementations, these means 714-720 operate on a single computer 700 without any of the means requiring a network connection. Supporting software and hardware 722 might then include the computer's operating system software, its file system software, its user interface software, and the hardware which stores, processes, or is controlled by that software. In other implementations, the system's means operate at least in part over a network connection 708, in which case the system includes at least two computers 700 which are in networked communication with each other, and the supporting software and hardware 722 provides networking support.

Some embodiments of a system according to the present invention include a storage volume 604 holding files 608 and corresponding system data structures 626, such as Master File Table, volume Metadata, File Allocation Table, free list, allocation bitmap, directory, log file, or inode data structures, for example. The files include user data stored in user data blocks 616 on the storage volume. The system data structures include system data stored in system data blocks 618 on the storage volume. The storage volume may span one or more disks, and it may be stored on magnetic hard disks or other media, such as flash memory, optical media, magneto-optical media, or other computer-readable media.

Some embodiments include a block-level I/O subsystem 628 which contains a driver for reading and writing blocks of data from and to storage volume locations. A firmware or ROM-stored BIOS often provides such block-level I/O mechanisms, but a BIOS per se is not required in every implementation. For instance, in some cases block-level I/O may be provided through an operating system storage subsystem API.

Some embodiments include a snapshot subsystem including a block list 622 identifying new storage locations of preserved data from blocks which have been overwritten with other data since a snapshot was enabled. The snapshot subsystem also includes a snapshot driver 614 which maintains the block list and which uses the block list when determining which block storage locations to access during I/O operations.

Some embodiments include a filesystem I/O subsystem 624 which presents applications with tools for file-level operations. For instance, it may present calls to routines to open a file, read from a file, write to a file, close a file, delete a file, read a list of file names and characteristics from a folder, and change the working directory (i.e., the current folder).

Some embodiments provide a user view 636 of the storage volume, through operation of at least the filesystem I/O subsystem and the block-level I/O subsystem. The user view presents information about files in their present state as opposed to their state at the time a snapshot became enabled. This is perhaps most useful when continued use 510 of the volume is made in a system that tracks changes to the user view separately from changes to a snapshot view 612. The snapshot view of the storage volume is provided in some embodiments through the filesystem I/O subsystem, the snapshot subsystem, and the block-level I/O subsystem to present information about files in a state other than their present state. The snapshot view is modified to update items 514 and/or to remove 514 undesired items so they are not placed 516 in the image 602 in an undesired state or an undesired context.

In some embodiments, a desired item identification 630 distinguishes desired files from undesired files. This may be done by listing desired items and their desired context expressly and thus implying that other items or security contexts or location contexts within a stated scope (e.g., a scope such as the current directory, the current directory tree, or the full volume) are not desired to be placed in the image 602. Alternately, the undesired items can be listed 630 and the desired items thus identified by implication. Alternately, some mixture of expressly identified desired items and expressly identified undesired items can be listed, with the remaining items in the scope, if any, implicitly categorized by an express default rule as desired, or by an express default rule in other embodiments as undesired.

In some embodiments, a deleter 632 is configured to automatically delete undesired files from at least one of the views 612, 636. In other embodiments, the deleter is fully interactive, requiring that the user dynamically identify 502 items which are desired and/or that the user dynamically identify 502 items which are undesired, in response one or more prompts from the system to the user through a user interface. The modifier 632 may also be only partially interactive, and it may modify security parameters in addition to, or instead of, deleting items. The deleter may be configured to delete undesired files from the user view, from the snapshot view, or both.

In some embodiments, an imaging program 634 is configured to create an image of the storage volume corresponding to the user view, from which the deleter has deleted undesired files as illustrated generally in FIG. 3. In other embodiments, the imaging program 634 is configured to create an image of the storage volume corresponding to the snapshot view, from which the deleter has deleted undesired files as illustrated generally in FIG. 4. Although FIG. 4 does not itself show continued use 510 of the volume, such use is made in some of the embodiments which image the volume through the modified snapshot view and a filter 614.

In some embodiments, the system is configured to transmit data, such as the content of user data blocks 616, of system data blocks 618, and/or snapshotted data blocks 620, over a network 708, in order to effect file-level operations 624 on files held on the storage volume. This may occur, for instance, when the storage volume 604 is not local to the computer(s) 700 but is instead network attached storage, a network drive on a server accessed by clients 700, or a RAID array used by multiple computers 700. It may also occur when the item selection and imaging are managed remotely, as when a management computer's items and storage are not being imaged but a remote managed computer 700's items 608, 610 and storage 604 are being classified 502 and selectively 514 imaged 516. In other systems, no network is required, and in some of these other system embodiments no network is even present.

In some embodiments, folders are not present; only files are present. In other embodiments, at least some of the files 608 are organized by the file system into folders 610. In such cases, the user view 636 of the storage volume may present information about folders in their present state as opposed to their state at the time a snapshot became enabled, with the snapshot view 612 of the storage volume presenting information about folders in a state other than their present state. The desired item identification 630 distinguishes desired folders from undesired folders, so the modifier 632 can be configured in some implementations to delete undesired folders from one of the views, for instance, instead of or in addition to being configured to delete 514 individual undesired files. Likewise, the system may change security parameters for folders rather than, or in addition to, changing security parameters for individual files, in file systems that use folders. When a folder is deleted, for instance, its member files (if any) and its member subfolders in the directory tree (if any) are likewise deleted. The imaging program is configured to create an image of the storage volume corresponding to the view (user view 636 or snapshot view 612) from which the deleter deletes undesired folders.

Configured Media

As illustrated in FIG. 7, the present invention also provides configured storage media 710. Suitable media include removable storage media such as memory keys, CDs, DVDs, Iomega Zip disks, Iomega Jazz drives, floppy disks, or other media removable from a computer and capable of carrying computer-readable data which persists even when power to the computer is turned off. Such media in their unformatted and generically formatted states are previously known. However, the invention permits the media to be specifically tailored to perform methods such as those illustrated by FIGS. 3-6, by magnetic, optical, or other bit-storing configurations 712 of data and instructions for performing such methods.

In some embodiments, a computer-readable storage medium 710 is configured by software 712 for performing a method that includes the steps of: classifying 502 items (files 608 and in some implementations folders 610) that are stored in a storage volume 604 to distinguish desired items from undesired items based on user input; freezing 504 the storage volume; enabling 506 snapshotting of the storage volume; unfreezing 508 the storage volume after enabling snapshotting; mounting 512 a snapshot view of the storage volume; deleting 514 undesired items from the mounted snapshot view, modifying 514 item security attributes, or otherwise selecting 514 items; creating 516 at least one image 602 of the storage volume via the mounted snapshot view after deleting undesired items; unmounting 518 the mounted snapshot view after creating the image(s); and disabling 520 snapshotting after creating the image(s).

In some embodiments, the configured medium's software further permits continued use 510 of the storage volume while the snapshotting is enabled. In some implementations, the step of creating at least one image creates a sector-by-sector image; in some it creates a cluster-by-cluster image.

CONCLUSION

Some embodiments of the invention may be seen as providing a technique of modifying the imaging filter driver's view of a snapshot by performing delete, security change, or other file system operations before an image file is made of the modified snapshot view of a storage volume. These and like embodiments provide a full internally consistent volume file system, with only the desired files and their system data defined and included in the image file, with volume metadata. Because the image 602 is a complete volume, it can then be treated like any other full volume in other processing steps, just as if the entire volume had been imaged but without having to transfer all the user and system data into a larger image file. When the image file contains a complete and consistent file system volume definition, this may allow the file system volume to be handled as one file that contains the selected files, and the processes and techniques developed to handle and process image files in a disassociated manner as described in U.S. patent application Ser. No. 10/406,139 filed Apr. 2, 2003 can be leveraged. In cases in which the volume definition (e.g., via a block list structure) is largely or wholly in volatile memory during changes, changes can be made very quickly.

Figure 2:
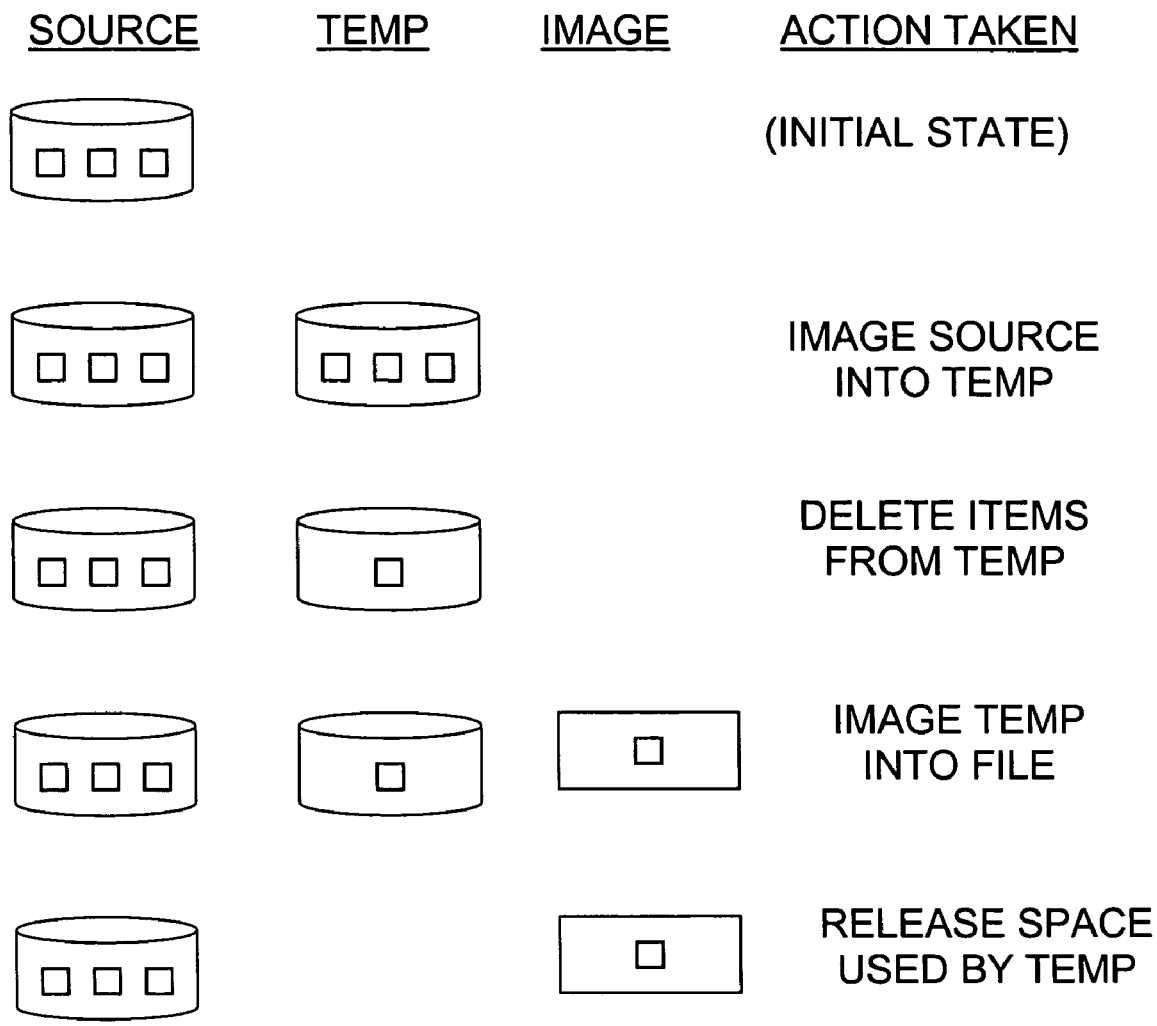
FIG. 2 is a diagram illustrating another conventional approach to obtaining an image file holding only particular items, and doing so without permanently removing data from the imaged volume, using a temporary storage volume.

Some embodiments, including some implementations of the approach illustrated generally in FIG. 4, overcome limitations of the approaches shown in one or more of FIGS. 1-3, because they do not require twice the used storage space to make a duplicate copy, the source volume is not modified so use of it can continue after the flush and snapshotting are instigated, one does not need to move large amounts of data to create a working copy of the source—changes to the snapshot view are done in-place in unused space of the volume, and there is nothing to "restore" to the source as the source is unmodified by the deletion and image creation. The approach shown in FIG. 4 can allow processing to continue on the system with little or no interruption, and allows the snapshot software to modify its held view into the source without modifying the source data.

Although particular embodiments of the present invention are expressly illustrated and described herein as methods or devices, it will be appreciated that discussion of one type of embodiment also generally extends to other embodiment types. For instance, the descriptions of inventive methods and configured storage media also help describe systems. It does not follow that limitations from one embodiment are necessarily read into another.

Headings are for convenience only; information on a given topic may be found outside the section whose heading indicates that topic. All claims as filed are part of the specification and thus help describe the invention, and repeated claim language may be inserted outside the claims as needed during prosecution.

It is to be understood that the above-referenced embodiments are illustrative of the application for the principles of the present invention. Numerous modifications and alternative embodiments can be devised without departing from the spirit and scope of the present invention. While the present invention has been shown in the drawings and described above in connection with the exemplary embodiments of the invention, it will be apparent to those of ordinary skill in the art that numerous modifications can be made without departing from the principles and concepts of the invention as set forth in the claims.

As used herein, terms such as "a" and "the" and designations such as "image" and "deleting" are inclusive of one or more of the indicated thing or step. In particular, in the claims a reference to a thing generally means at least one such thing is present and a reference to a step means at least one instance of the step is performed.

The scope of the invention is indicated by the appended claims rather than by the foregoing description. All changes which come within the meaning and range of equivalency of the claims are to be embraced within their scope to the full extent permitted by law.

What is claimed is:

1. A method for using a snapshot and creating an image file that holds selected items found on a computer-readable storage volume, without permanently removing data from the volume, the method comprising the steps of:
   identifying at least one desired item which is located on the storage volume;
   enabling a snapshot of at least a portion of the storage volume which includes the desired item;
   after said enabling step, deleting at least one item other than the desired item;
   after said deleting step, imaging the desired item into an image, the image not containing the deleted item(s) by reason of said deleting step; and
   after said imaging step, releasing snapshot resources.

2. The method of claim 1, wherein said deleting step deletes from the storage volume at least one item other than the desired item, said imaging step then images the desired item into an image from the storage volume, and said releasing step comprises releasing the deleted item by restoring it from the snapshot to the storage volume.

3. The method of claim 1, wherein said deleting step deletes from a snapshot view of the storage volume at least one item other than the desired item, and said imaging step then images the desired item into an image from the snapshot view of the storage volume.

4. A method for using a snapshot, rather than a full volume copy, to preserve selected items when creating an image file with items from a computer storage volume, the method comprising the steps of:
   classifying each item on at least a specified portion of the storage volume as being either a desired item or else an undesired item;
   enabling a snapshot of the storage volume which includes the desired item, thereby providing a snapshot view of the storage volume;
   selecting a desired item in the snapshot view of the storage volume; and
   imaging the desired item from the snapshot view of the storage volume into an image.

5. The method of claim 4, wherein said classifying step comprises obtaining a list of desired items, and each item on the storage volume that is not listed on said list is classified as an undesired item.

6. The method of claim 4, wherein said classifying step comprises obtaining a list of undesired items, and each item on the storage volume that is not listed on said list is classified as a desired item.

7. The method of claim 4, wherein said snapshot enabling step is preceded by the step of invoking an operating system service to freeze the volume to prevent changes to it before completion of said snapshot enabling step.

8. The method of claim 4, wherein said snapshot enabling step is preceded by the step of notifying a running application to flush its current state to disk.

9. The method of claim 4, wherein said snapshot enabling step is followed by the step of making use of the volume, for a purpose other than imaging and snapshotting, while the snapshot tracks changes to the volume caused by such use.

10. The method of claim 4, wherein said selecting step comprises selecting a security attribute value for an item and setting that security attribute value through the snapshot view.

11. The method of claim 4, wherein said selecting step comprises deleting an item through the snapshot view.

12. The method of claim 11, wherein said deleting step is preceded by the step of mounting the snapshot view, and said deleting step comprises invoking a deletion tool through an interface that is also used to delete items when no snapshot is enabled.

13. A method for using a snapshot when creating an image file of selected items stored in a volume readable by a computer, the method comprising the steps of:
 providing input which permits a computer program to classify each item on the volume as being either a desired item or else an undesired item;
 causing the computer to enable a snapshot of the volume which includes all desired items, thereby providing a snapshot view of the volume;
 causing the computer to delete all undesired items from the snapshot view of the volume;
 causing creation of an image that is made by imaging the desired items only (no undesired items) from the snapshot view of the volume; and
 causing the computer to disable the snapshot, after which the undesired items are visible on the volume.

14. A system for creating an image file with selected files, comprising:
 a computer storage volume holding files;
 identification means for obtaining an identification of files of the storage volume, said identification means distinguishing desired files from undesired files;
 snapshot means for tracking changes to the storage volume, said snapshot means preserving a copy of data that is changed while said snapshot means is enabled and doing so without requiring a copy of all data of the storage volume, said snapshot means further providing a snapshot view of the storage volume;
 selection means for selecting desired files through the snapshot view of the storage volume; and
 image means for imaging files, corresponding file system data, and other volume system data, by imaging from the snapshot view of the storage volume into an image;
 wherein said means collectively comprise computer hardware and computer software running on that hardware.

15. The system of claim 14, wherein said selection means comprises a deletion means for deleting undesired files from the snapshot view of the storage volume.

16. The system of claim 14, wherein said files are organized in folders, and said identification means permits a file to be identified indirectly through identification of a folder containing the file.

17. The system of claim 14, wherein said system operates on a single computer without any of said means requiring a network connection.

18. The system of claim 14, wherein said system operates at least in part over a network connection, said system comprising at least two computers which are in networked communication with each other.

19. A system comprising:
 a storage volume holding files and system data structures, the files including user data stored in user data blocks, the system data structures including system data stored in system data blocks;
 a block-level I/O subsystem comprising a driver for reading and writing blocks of data from and to storage volume locations;
 a snapshot subsystem comprising a block list identifying new storage locations of preserved data from blocks which have been overwritten with other data since a snapshot was enabled, the snapshot subsystem also comprising a snapshot driver which maintains the block list and which uses the block list when determining which block storage locations to access during I/O operations;
 a filesystem I/O subsystem which presents applications with tools for file-level operations;
 a user view of the storage volume provided through at least the filesystem I/O subsystem and the block-level I/O subsystem, which presents information about files in their present state as opposed to their state at the time a snapshot became enabled;
 a snapshot view of the storage volume provided through the filesystem I/O subsystem, the snapshot subsystem, and the block-level I/O subsystem to present information about files in a state other than their present state;
 a desired item identification which distinguishes desired files from undesired files;
 a modifier configured to modify files in one of said views; and
 an imaging program configured to create an image of the storage volume corresponding to the view in which the modifier modifies files.

20. The system of claim 19, wherein said modifier comprises a deleter that is configured to delete undesired files from the user view.

21. The system of claim 19, wherein said modifier comprises a deleter that is configured to delete undesired files from the snapshot view.

22. The system of claim 19, wherein said modifier comprises a security attribute changer that is configured to change a security attribute of a file in the snapshot view.

23. The system of claim 19, wherein said system is configured to transmit data over a network to effect file-level operations on files held on the storage volume.

24. The system of claim 19, wherein at least some of said files are organized into folders, said user view of the storage volume presents information about folders in their present state as opposed to their state at the time a snapshot became enabled, said snapshot view of the storage volume presents information about folders in a state other than their present state, said desired item identification distinguishes desired folders from undesired folders, a deleter in said modifier is configured to delete undesired folders from one of said views, and said imaging program is configured to create an image of the storage volume corresponding to the view from which the deleter deletes undesired folders.

25. The system of claim 24, wherein said deleter is configured to delete undesired folders from the snapshot view.

26. A computer-readable storage medium configured by software for performing a method comprising the steps of:
 classifying items stored in a storage volume to distinguish desired items from undesired items based on user input;
 freezing the storage volume;
 enabling snapshotting of the storage volume;
 unfreezing the storage volume after enabling snapshotting;
 mounting a snapshot view of the storage volume;
 deleting undesired items from the mounted snapshot view;
 creating at least one image of the storage volume via the mounted snapshot view after deleting undesired items;
 unmounting the mounted snapshot view after creating the image(s); and
 disabling snapshotting after creating the image(s).

27. The configured medium of claim 26, wherein said method further comprises permitting continued use of the storage volume while the snapshotting is enabled.

28. The configured medium of claim 26, wherein said step of creating at least one image comprises creating a sector-by-sector image.

29. The configured medium of claim 26, wherein said step of creating at least one image comprises creating a cluster-by-cluster image.

* * * * *